INVENTOR.
FREDERICK Y. GREPE
BY
Andrus & Starke
Attorneys

United States Patent Office 3,345,548
Patented Oct. 3, 1967

3,345,548
ELECTRIC HOIST CONTROL SYSTEM
Frederick Yorke Grepe, Scarborough, Ontario, Canada, assignor, by mesne assignments, to A. O. Smith, Milwaukee, Wis., a corporation of New York
Filed May 13, 1965, Ser. No. 455,545
14 Claims. (Cl. 318—203)

ABSTRACT OF THE DISCLOSURE

A three phase alternating current induction motor is selectively connected to the power lines by operation of a hoist control drum contactor. The rotor circuit of the motor includes a plurality of resistor sections selectively connected into the circuit by operation of the drum contactor. The rotor is coupled to a friction brake which is spring loaded to the set position and released by energization of a winding and to an eddy current brake having a winding connected to a D.C. source. The eddy current brake winding is connected to the D.C. source in series with a set brake control relay and a current limiting adjustable resistor which normally limits the current to a value below the operating level for the relay. In parallel with this resistor is a relay switch controlled by a hoist relay to provide maximum energization under all lowering conditions. A second relay switch in series with a variable resistor is also connected in parallel with the first variable resistor and this relay is controlled by the contactor during selected positions of the contactor to provide a paralleled resistance for reducing the energization of the eddy current brake to an intermediate level. The eddy current brake is therefore energized with the contactor in the off position but at a level insufficient to actuate or operate the relay and release the friction brake.

---

Figure 1:
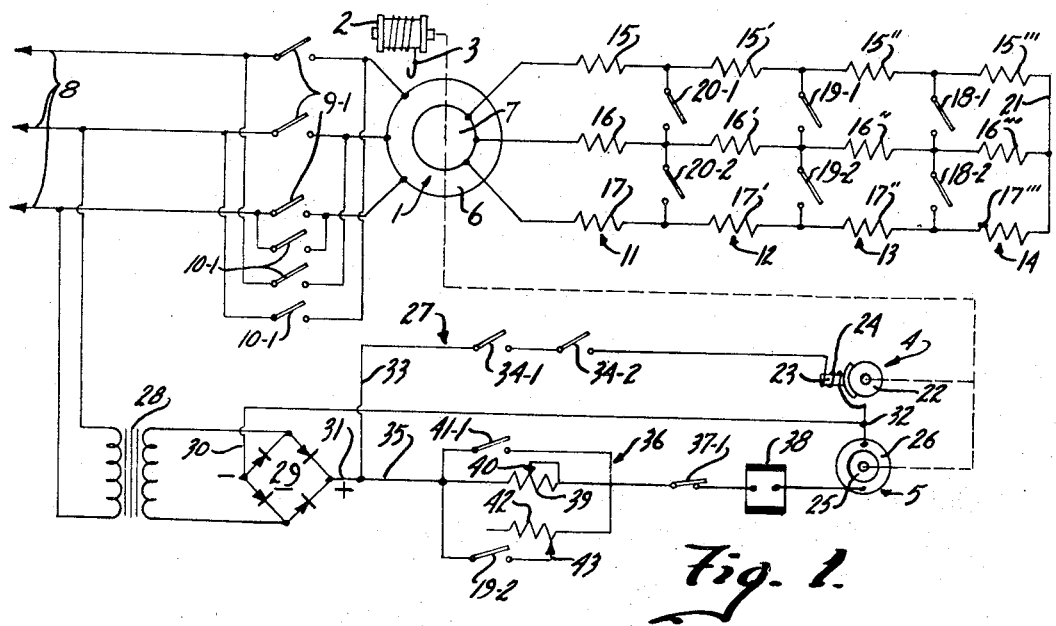

This invention relates to an electric hoist control system and particularly to a control system of a motor which is coupled to rotate a winding drum for hoisting and lowering a load carried at the end of a cable wound on the drum.

Highly satisfactory hoist control systems have been developed wherein a polyphase alternating current motor is utilized for rotating a cable drum to position a load supporting cable. The motor may be a wound rotor induction motor with external resistor sections selectively connected in a rotor circuit to provide a controllable output torque. A highly satisfactory control has employed a manually operable drum controller having a number of lowering and hoisting points selectively inserting and removing resistance from the rotor circuit and thereby controlling the speed of load movement. The operator of an electric hoist control must have a certain minimum amount of skill in order to prevent overhoisting of the load and damaging the drum mechanism or the like as well as to prevent excessive overhauling and dropping of the load. A safety feature which has been proposed is to provide an eddy current brake unit interconnected mechanically with the motor rotor and the drum, with the eddy current brake providing a braking action proportional to the degree of the energization of its winding. For example, the winding energization may be changed in accordance with the setting of the drum controller such that the speed of the lowering and hoisting is controlled conjointly by the secondary resistance of the rotor circuit and by the braking action of the eddy current brake. A highly satisfactory eddy current braking system is shown in the United States Patent 2,985,809 issued to J. A. Cortelli et al. As disclosed in that patent, an eddy current brake is connected in series with a friction holding or set brake such that the friction brake is released at the same time the eddy current brake is energized. Other forms of interrelated controls have been suggested, for example U.S. Patent 2,653,291 describes a completely separate energizing control for the eddy current brake and a friction brake. U.S. Patent 2,493,607 also disclosed a control whereby the setting of a drum controller provides various predetermined degrees of energization of the eddy curent brake.

The present invention is particularly directed to an improved interlocking control system for the energization of a friction brake and an eddy current brake connected to a cable drum and drive motor rotor and in particular, provides an interlocking control whereby the eddy current brake must be energized prior to energization of the friction brake. As a result, the positive holding force of the friction brake is always maintained until after a predetermined minimum energization of the eddy current brake.

In accordance with the present invention, the eddy current brake circuit includes a relay means or the like having switch means for controlling release of the set brake; generally through an interlocking control circuit. The eddy current brake circuit includes a plurality of branch circuits for adjusting the eddy current brake energization and for providing a selected interlocking energization of the relay means. The improved circuit preferably provides a means for varying the energization of the eddy current brake in preselected steps in accordance with hoisting and lowering positions and thereby provide a preferred energization of the eddy current brake.

In the preferred construction of the present invention, the control circuit is also arranged and constructed such that in all hoisting and lowering positions the motor includes rotor circuit resistance whenever driving against a fully excited eddy current brake. The advantage of this system is the elimination of high current surges which could readily cause overheating and possible destruction of the motor.

The present invention thus provides an improved motor control for an alternating current crane or hoist motor which creates a plurality of hoisting and lowering speeds.

The drawing furnished herewith illustrates one mode of carrying out the invention in which the above advantages and features are clearly incorporated as well as others which will be readily understood by those skilled in the art from the following description.

Figure 2:
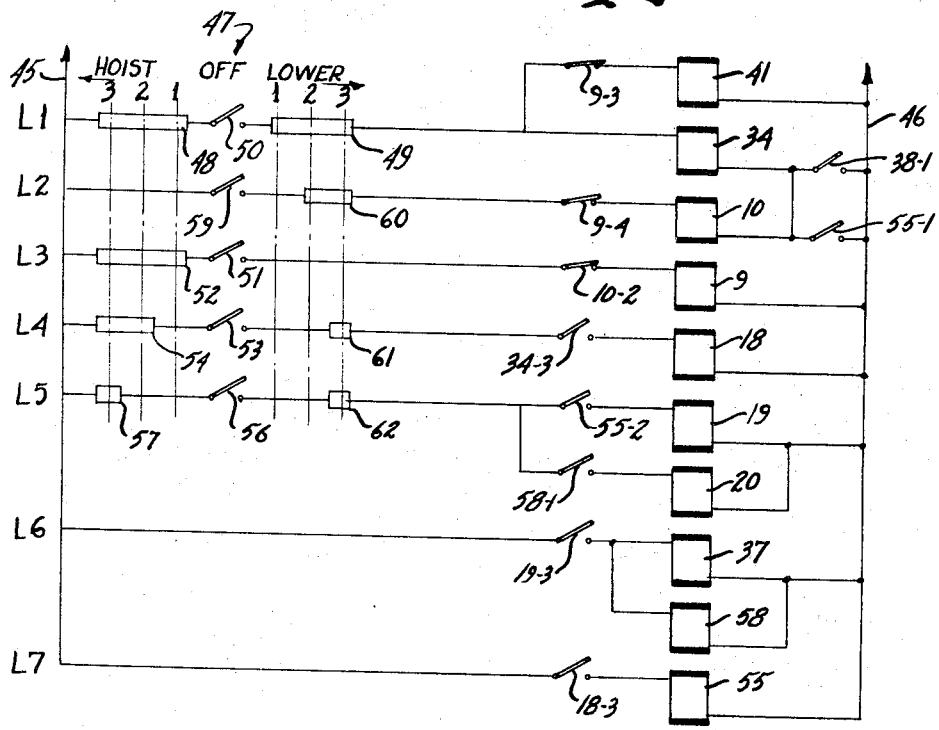

In the drawing, FIG. 1 is a circuit diagram of a hoist motor system employing an alternating current motor in combination with an eddy current brake and a friction brake connected in accordance with the present invention; and FIG. 2 is a schematic control circuit including controlling relays for the circuit shown in FIG. 1.

Referring to the drawing and particularly to FIG. 1, an alternating current hoist motor 1 is shown coupled to a hoist drum 2. A cable 3 is wound on the drum 2 and terminates in a supporting hook on which a load, not shown, may be secured. A friction set brake 4 and an eddy current brake 5 are mechanically interconnected with the hoist motor 1 and the hoist drum 2 to provide controlled movement of the drum in response to selected energization of the motor 1. The friction brake 4 is a normally set brake which provides a positive stop on the movement of the drum 2 whenever the motor 1 is de-energized. The eddy current brake 5 generally provides a controlled braking effect opposing the driving action of the motor 1 and/or the overhauling of drum 2 for a plurality of different hoisting and lowering positions.

Generally the hoist motor 1 is diagrammatically illustrated as including a three phase stator section 6 and a wound rotor 7. The stator 6 is connected to suitable three phase power lines 8 by hoist contacts 9–1 which are controlled by a contactor or hoist relay 9 shown in line L–3 of FIG. 2. When contacts 9–1 close, motor 1 is energized to raise the hook 4. Additionally, a set of lowering contacts 10–1 reversely interconnect the stator 6 to the line 8 for energizing motor 1 to lower the hook 4. The relay 10 for controlling the lowering contacts 10–1 is connected in line L–2 of the control circuit shown in FIG. 2. Four resistor sections 11 through 14 are connected in circuit with the rotor 7 to control the speed of the motor 1. The speed of the motor 1 is directly related to the amount of the resistance in the rotor section and the several resistor sections are described and identified herein as a permanent resistor section 11, a high speed resistor section 12, a medium speed resistor section 13, a low speed resistor section 14. Each of the sections similarly include three resistors 15, 16 and 17 connected, respectively, one each in each phase of the rotor circuit. The three resistors in the sections 11 through 14 are similarly numbered with the resistors in section 12, 13, and 14 distinguished by the addition of single, double and triple primes, respectively.

Connection of the resistors 15, 16, and 17 into the circuit is controlled by a plurality of contactors or relays 18 through 20 inclusive, shown in FIG. 2, having related contacts, shown in FIG. 1. When all of the contacts of relays 18 through 20 open, the return path is made through a common line 21 connecting the outer ends of the section 14 such that all of the resistor sections 11 through 14 are inserted in the circuit.

Relay 18 is a high speed control including normally open contacts 18–1 and 18–2 which connect the phase lines between sections 13 and 14. When the relay 18 is energized, contacts 18–1 and 18–2 close to short circuit the resistors 15''', 16''', and 17''' of section 14 and operably removed them from the circuit. The rotor current will increase and tend to increase the rotor speed, in accordance with well known motor operation.

Normally open contacts 19–1 and 19–2 are similarly connected between sections 12 and 13 to selectively short circuit both sections 13 and 14 and effectively remove them from the circuit to further reduce the motor speed. Contacts 20–1 and 20–2 of relay 20 are also normally open and are connected between sections 11 and 12 to short circuit or bypass sections 12, 13, and 14, and thereby reduce the rotor resistance to the permanent resistance section 11.

The friction brake 4 is provided which serves as a positive friction force for holding the motor 1 in any desired stopped position. The friction brake 14 is a well-known unit heretofore employed in hoist controls and includes a rotor 22 coupled to the motor rotor 7 as diagrammatically shown by the dashed coupling line. A brake yoke 23 is spring loaded to a set or hold position. A release winding 24 is coupled to yoke 23 for selectively releasing the friction brake, freeing the rotor 22 to turn.

To provide control of the speed of the hoist system, the eddy current brake 5 is provided. Eddy current brake 5 includes a rotor 25 interconnected with rotor 22 of the friction brake 4 and the motor rotor 7 as diagrammatically shown. A brake stator winding 26 is excited with a direct current to adjust the rotational freedom of the rotor 25 in accordance with the degree of excitation. The windings 24 and 26 are interconnected in an interlocking control circuit 27 which forms the subject matter of the present invention.

In the illustrated embodiment of the invention, a control transformer 28 is connected across two of the three power lines 8 to provide a single phase current. The output of the transformer 28 is connected to the input of a full wave bridge rectifier 29 having output leads 30 and 31. Lead 30 constitutes a common return lead to the windings 24 and 26 and is connected thereto as at a junction 32. A friction brake lead 33 is connected to lead 31 and to the winding 24 of the friction brake in series with braking relay contacts 34–1 and 34–2, the relay 34 controlling these contacts being connected in FIG. 2.

Similarly, an eddy current brake lead 35 is connected to the winding 26 in series with three paralleled energizing level branch circuits 36, a set of normally closed interlocking relay contacts 37–1 and a friction brake release interlocking relay 38.

The relay contacts 37–1 are controlled by a disconnect relay 37 connected in the control circuit of FIG. 2 for opening of the eddy current brake circuit under select conditions, as hereinafter developed.

The interlock relay 38 includes a set of normally open contacts in the circuit of FIG. 2 to prevent operation of the control circuit prior to energization of the eddy current brake 5.

The three paralleled branch circuits 36 provide for three levels of energization of the eddy current brake 5. The one branch includes a resistor 39 having an adjustable tap 40 to preset the energization of the eddy current brake 5 in a standby operating condition. Power is supplied to the brake 5 from rectifier 29 through a complete circuit beginning at direct current lead 35 and through the portion of resistor 39 to the tap 40, through the normally closed contacts 37–1 and the interlock relay 38, the eddy current winding 26 and then back to the rectifier 29 via the common junction 32 and the common return lead 30. However, the circuit to the friction brake via line 33 will be broken at the normally open contacts 34–1 in the standby or off position. In this condition, the friction brake 4 is set to provide a positive holding force and the energization of the eddy current brake 5 is with a minimum excitation to provide minimal off point braking. The latter is desirable to minimize consumption of power and the like.

A set of normally open relay contacts 41–1 is connected in a second branch line in parallel with resistor 40 to produce a maximum eddy current braking. These contacts 41–1 are controlled by a lowering relay 41 connected in the circuit of FIG. 2 and energized during lowering of a load to short circuit or bypass the resistor 36 during a lowering of the cable and hook unit 3. This provides maximum excitation of the eddy current brake 5 during a lowering operation to prevent overhauling of the load.

A hoisting control resistor 42 having a movable tap 43 is connected in parallel with the resistor 39 in series with a set of hoisting relay contacts 19–2 of relay 19. The circuit is selected such that when contact 19–2 is closed, the parallel resistance of resistors 39 and 42 provides an intermediate or medium resistance in circuit with the eddy current brake 5 and therefore an intermediate or medium energization of the eddy current brake 5.

The operation of the circuit of FIG. 1 may therefore be briefly summarized as follows.

In the standby position, the motor 1 will be de-energized as a result of the open contacts 9–1 and 10–1. Similarly all of the contacts controlling resistance section 11 through 14 will be open and insert maximum resistance into the rotor circuit. Additionally, the friction brake 4 will be de-energized and provide a positive holding force on the drum 2 thereby preventing lowering of the cable and hook unit 3. Simultaneously, the eddy current brake 5 will be energized with a minimum or low energization and slight braking action. If for any reason the eddy current brake circuit is opened, relay 38 is de-energized and its related contacts 38–1 in the control circuit of FIG. 2 open. As a result, friction brake 4 cannot be released and motor 1 cannot be energized whereby the hoist system is held in the set position.

Referring particularly to FIG. 2, an across-the-line type circuit is illustrated with the branch lines numbered L–1 through L–7 inclusive connected between a pair of power lines 45 and 46 for purposes of simplicity and clarity of subsequent explanation. The control circuit of FIG. 2 has been simplified to eliminate the conventional trolley and bridge type contacts as well as certain safety or overload contacts or the like which normally form a part thereof. Additionally, a main contactor, not shown, will usually be inserted into the circuit for controlling the completion of the power connection through the power lines 8. As such components are standard, well-known components, they have not been shown in order that the present invention might be more clearly set forth.

Referring then to FIG. 2, the power lines 45 and 46 may be connected to any suitable source of power, for example, across the secondary of the transformer 28.

A drum controller 47 is provided for energizing motor 1 and brakes 4 and 5 in a plurality of different hoist and lower positions. Drum controller 47 is diagrammatically illustrated having a plurality of normally open contacts connected in lines L–1 through L–5. The contacts are closed by a plurality of hoist contact bars and a plurality of lowering contact bars on the drum aligned with the respective contacts, as presently described. All of the contacts move in unison in accordance with known operations from a central off position to the right or to the left. In the illustrated invention, three hoisting positions are given to the left of the off position and three lowering speed positions to the right of the off position.

The brake relay 34 for controlling the braking contacts 34–1 and 34–2, which are connected in series circuit with the friction brake 4 in FIG. 1, is connected in line L–1 in series with a hoisting contact bar 48 and a lowering contact bar 49 as well as the normally open drum contacts 50 which are controlled by the bars and the interlock contacts 38–1 of relay 38. The contact bars 48 and 49 respectively span the three hoisting and three lowering speed positions. Whenever the drum control is rotated to either a hoist or lower position, the normally open contacts 50 will be closed and complete a series circuit between power lines 45 and 46 to energize brake relay 34 if the eddy current interlocking contacts 38–1 are closed. As previously noted with respect to FIG. 1, relay 38 is connected in series with the eddy current brake winding 26 and consequently the eddy current brake 5 must be energized before the brake relay 34 can be energized.

In the illustrated embodiment of the invention, the lowering control relay 41, in series with set of normally closed contacts 9–3 of the hoist control relay 9, is connected in parallel with the brake relay 34 and the interlocking contacts 38–1. When the drum controller 47 is moved to any lowering position, current is supplied to the relay 41 which will close its contacts 41–1 in the circuit of FIG. 1. Contacts 41–1 are connected in the eddy current brake excitation circuit and when closed by-pass or short-out, the resistors 36 and 42 whereby they are operatively disconnected and maximum excitation of the eddy current brake 4 is provided.

Placing controller 47 in a hoisting position opens the relay contacts 9–2 to prevent closing of contacts 41–1 as just described.

The relay 9 is shown connected in line L–3 between power lines 45 and 46 and in series with a set of normally open hoist drum contacts 51 and a set of normally closed contacts 10–2 of the lowering relay 10. A hoist contact bar 52 is provided for controlling the normally open contacts 51 and is positioned to the hoist side of the drum such that contacts 51 are closed during, and only during, hoisting operations. The contact bar 52 spans all three hoisting settings or positions to energize the relay 9 closing the hoisting contacts 9–1 in the power lines 8 to properly energize the motor 1 to rotate the associated rotor 7 in a cable raising direction. Additionally, the energization of relay 9 opens the contacts 9–3 in the circuit of line L–1 and therefore positively maintains the circuit to relay 41 open.

Referring particularly to FIG. 2, relays 18, 19 and 20 which control the operative connection of the resistor sections 11–14 in the rotor circuit of the hoist motor 1 are not energized during the first hoist position. Consequently, maximum resistance is inserted in the circuit at the first hoist position and motor 1 is energized to drive drum 2 at a relatively slow speed.

At the first hoist position, the circuit is as follows. The friction brake 40 is released, the eddy current brake 5 is energized with a medium excitation and the motor 1 is energized with a maximum rotor resistance to produce a minimum hoisting torque. The drum 2 will therefore be rotated at the slowest hoisting speed and correspondingly slowly raise hook 3.

In moving to the second hoisting position, the circuit for eddy current brake 5 and the connection of the stator 6 of the hoist motor 1 remains the same as in the first hoist position as a result of the extension of bars 48 and 52. However, in the second hoisting position, relay 18 in line L–4 is also energized, as follows. A set of normally opened contacts 53 of the drum controller 47 are connected in series with the relay 18 and a set of normally open contacts of the brake relay 34. The brake relay 34 which is connected in lines L–1 is energized as in the first hoist position to condition line L–4 for completion through contacts 53 by closing of the contacts 34–3. The drum controller 47 includes a contact bar 54 aligned with contacts 53 and spanning the second and third positions for hoisting. Consequently, moving to the second position closes contacts 53 and completes the circuit to energize relay 18 and close the related contacts 18–1 and 18–2 in FIG. 1. Contacts 18–1 and 18–2 are connected between resistor sections 13 and 14 of the motor's rotor circuit such that closing thereof bypasses or shorts out the resistor section 14. The reduced resistance in the rotor circuit of motor 1 at the second hoist position proportionately increases the motor speed to more rapidly drive the drum 2 and raise hook 3.

Energizing of relay 18 in line L–4 also closes a set of contacts 18–3 connected in series with a timing relay 55 in line L–7. Timing relay 55 operates to close two sets of associated contacts 55–1 in line L–2 and 55–2 in line L–5, after a predetermined time delay. Contacts 55–1 are connected in parallel with the interlock contacts 38–1 and consequently provide a bypass or latching circuit such that the eddy current brake can be de-energized so long as contacts 18–3 are closed to hold the relay 55 energized. This is provided to condition the circuit for maximum hoist speed, as presently described.

The contacts 55–2 of the timing relay 55 are connected in the branch line L–5 in series with the relay 19 for establishing the maximum hoist speed. The drum controller 47 includes a set of normally open contacts 56 in line L–5 which are connected in series with the normally open relay contacts 55–2 and the relay 19. A contact bar 57 of the drum controller 47 spans only the third hoist position in alignment with contacts 56. Consequently, when the drum controller is moved to the third hoist position to provide maximum hoist speed, the prior circuits remain substantially as described and the contacts 56 are closed to complete the circuit to the relay 19 as a result of the previous energization of relay 55 and the closing of contacts 55–2.

Energizing of relay 19 closes the associated contacts 19–1 and 19–2 connected between sections 12 and 13 of the motor's rotor circuit in FIG. 1 to further reduce the resistance in the rotor circuit and thereby increase the torque and output speed of the motor 1.

Relay 19 further controls a third set of contacts 19–3 which are connected in series in line L–6 with the brake disconnect relay 37 having contacts 37–1 in the eddy current brake circuit of FIG. 1. Consequently, movement of the drum controller to the high speed third hoisting position results in the energizing of the disconnect brake relay 37 and the opening of the circuit to the eddy current brake 5 which then merely idles and allows motor 1 to operate without any opposing or braking force other than that exerted by the drum 2 and the load connected to the hook and cable unit 3.

After a selected time period, a second timer 58 which is connected in parallel with the brake release relay 37 times out and closes a related set of contacts 58–1 which are connected to energize relay 20.

The relay 20 in series with the contacts 58–1 is connected in parallel with the relay 19 and the timer contacts 55–2. Consequently, relay 20 is energized in the third hoisting position after the timed closing of the related contacts 58–1. Energizing of relay 20 closes contacts 20–1 and 20–2 in the rotor circuit of FIG. 1 to operatively disconnect the rotor sections 12, 13 and 14 while leaving only rotor section 11 operative in the circuit. Consequently, motor 1 is energized with a minimum rotor section and will provide maximum raising speed. Thus, the third hoisting position provides a stepped acceleration by first de-energizing the eddy current brake 4 and thereafter increasing the rotor current of motor 1. To lower a load, the drum controller 47 is moved in the opposite direction to align lowering contact bars with the respective switches.

The main lowering relay 10 is connected in line L–2 in series with a set of normally open contacts 59 of the drum controller 47. The contacts 59 are normally open contacts as are the other related drum controller contacts and are aligned with a contact bar 60 which spans only the second and third lowering positions. Consequently, in the first lowering position, only contacts 50 of line L–1 in FIG. 2 are closed by the contact bar 49. The latter provides a circuit brake release relay 34 and to relay 41, assuming the closure of contacts 38–1 by the interlock relay 38 of FIG. 1. Relay 41 then closes its related contacts 41–1 to complete the bypass around resistors 39 and 42 in FIG. 1 to the eddy current brake 5. The brake 5 is thus energized with maximum current and provides maximum retarding torque to the movement of the drum 2 and friction brake 4 is de-energized to release the drum 2 for movement. The relay 10 is de-energized in the first lowering position as is the hoist relay 9. Consequently, the motor 1 is de-energized and merely idles. Thus, during the first lowering position, the load itself is the only force acting to lower the load by unwinding of the cable and hook unit from the drum 2 and this force is opposed by the eddy current brake 5 to prevent load run-away.

In moving to the second lowering position, the contact bar 60 closes contacts 59 and completes the circuit to the relay 10 via the normally closed contacts 9–3 and the interlock contacts 38–1. Relay 10 is then energized to close the contacts 10–1 and supply current to the motor 1 in a direction reversed of that effected by relay 9. Consequently, the rotor 7 tends to rotate in a direction opposite to that for hoisting and provides a positive lowering of the hook and cable unit 3.

When relay 10 is energized, it also opens the contacts 10–2 in line L–3 to positively prevent energizing of the relay 9. This is desirable to prevent accidental short circuit conditions being created across the power lines as a result of the simultaneous closing of the contacts 10–1 and 9–1.

In the second lowering position, the eddy current brake 5 is energized with maximum excitation and the motor 1 provides a small lowering torque.

In the final lowering position, the rotor section relays 18, 19 and 20 are sequentially energized, as follows.

A contact bar 61 is provided on the drum controller 47 in the third lowering position in alignment with the contacts 53. Consequently, movement to the third position closes contacts 53 and completes the circuit to the relay 18 via the contacts 34–3 which are closed as a result of the energizing of the brake release relay 34 in line L–1. Energization of relay 18, as in the second and third hoisting positions, closes contacts 18–1 and 18–2 to bypass resistor section 14.

It simultaneously closes contacts 18–3 in line L–7 and energizes timer 55. After the selected time delay, contacts 55–2 close to condition the circuit to relay 19. The drum controller 47 includes a contact bar 62 properly aligned with the contacts 56 to close the contacts in the third lowering position and thereby complete the circuit to the relay 19 after the timed closing of contacts 55–2. This, then, results in a timed energization of the relay 19 and a closing of the contacts 19–1 and 19–2 to disconnect the rotor resistor sections 13 from the rotor circuit of the motor 1 and thereby further increases the lowering speed.

The relay 19 further closes the related contacts 19–3 in line L–6 to energize the brake disconnect relay 37. When relay 37 is energized, the brake disconnect contacts 37–1 in the eddy brake current excitation circuit of FIG. 1 open to de-energize the eddy current brake 5 which then idles.

Simultaneously, the relay 58 which is connected in parallel with the eddy current brake disconnect relay 37 is energized.

After a selected time delay, contacts 58–1 in line L–5 close to complete the circuit to the relay 20 in parallel with the relay 19 and actuate contacts 20–1 and 20–2. In this position, the minimum rotor resistance is inserted into the circuit via the single rotor section 11. Thus, maximum lowering torque is provided to positively lower the load.

The overall operation of the illustrated embodiment of the invention can be briefly summarized as follows.

In the first hoist position, the motor 1 is energized with rotor sections 11, 12, 13 and 14 connected in the circuit and produces a low hoisting torque as a result of high rotor circuit resistance and the low current. The eddy current brake 4 has a medium excitation as a result of the closing of contacts 9–2 and the paralleling of the resistors 36 and 42 to lower the resistance and increase the current to the eddy current brake 5. This connection is established as a result of the energization of the hoist relay 9 in line L–3. Simultaneously, this increased current energizes the relay 38 to close its related contacts 38–1 in line L–1 of FIG. 2 to complete the circuit to the brake release relay 34 which closes its related contacts 34–1 and 34–2 in FIG. 1 to energize friction brake winding 24 and release the brake.

In the second hoist position, the motor 1 operates with a medium rotor circuit resistance as a result of the closing of contacts 18–1 and 18–2 and the eddy current brake 5 is maintained with a medium excitation as in the first hoist position. This results as a result of the previous described operation of the circuit in combination with the energization of the relay 18 through closing of drum controller contacts 53 in line L–4 and the timed operation of the timing relay 55 in line L–7.

In the third hoist position, the motor 1 provides the two step hoist acceleration.

During the first step, the motor 1 hoists with a low rotor circuit resistance as a result of the closing of contacts 19–1 and 19–2 and simultaneously the eddy current brake 5 is de-energized as a result of the opening of contacts 37–1. This results from the previous circuit operation in combination with energization of the relay 19 through the drum controller contacts 56 and the energization of relay 37 in line L–6. The latter also energizes timing relay 58 to produce the second accelerating step.

After a timed period the motor relay 58 operates and is operated with only the permanent rotor section 11 connected in the circuit of rotor 7 and with the eddy current brake 5 de-energized to provide maximum hoisting speed. This results from the energization of the timing relay 58 and the timed closing of its contacts 58–1 in the circuit of relay 20, line L–5 of FIG. 2, which closes contacts 20–1 and 20–2 to reduce the resistance in the rotor circuit to a minimum.

When the drum controller is moved back to the off position, all of the branch circuits open the motor circuit as shown in FIG. 1. Although contacts 37–1 are closed, the interlock relay 38 does not then close its contacts 38-1 in line L-1 of FIG. 2 because resistor 36 reduces the current below the operating level of that relay. Consequently. the eddy current brake 5 has the low excitation for off-point braking.

When moved to the first lowering position, the motor 1 is completely disconnected from the circuit as a result of the fact that relay 10 is not energized and the contacts 10-1 remain open. However, relay 41 in line L-1 is energized to close contact 41-1 and provide high or maximum excitation to the eddy current brake 5. This will simultaneously operate relay 38-1 to close contacts 38-1 in line L-1 thereby energizing relay 34 to close contacts 34-1 and 34-2 to release the friction brake. The net forces then acting on the drum 2 are the summation of the lowering force exerted by the load and the opposite or retarding force exerted by the eddy current brake 5. As a result, in the first lowering position, the load is allowed to fall under its own weight, retarded however by the high excitation of the eddy current brake 5.

In a second lowering position, the circuits corresponding to the first lowering position are maintained except that the relay 10 in line L-2 is energized by the now closed contacts 59. As a result, the motor 1 is energized to provide a positive lowering current with a high rotor circuit resistance, providing a minimum torque. At this time, the eddy current brake 5 still has maximum excitation.

In the third or high speed lowering step, the load is accelerated downwardly in three distinct steps. Relay 18 is first energized as a result of the closing of the contacts 53 in line L-4. Contacts 18-1 and 18-2 then close to remove resistor section 14 to reduce the resistance in the circuit of rotor 7 by that of section 14. This then provides motor drive with medium rotor circuit excitation while maintaining eddy current brake excitation at a maximum through the closed contacts 41-1 and the closed contact 37-1.

Energizing of relay 18, however, also closes the associated contacts 18-3 to energize timing relay 55. After the time period, contacts 55-2 close to complete the circuit to the relay 19 via the now closed contacts 56 of the drum controller in line L-5. Energizing of relay 19 closes contacts 19-1 and 19-2 to bypass or operatively disconnect sections 13 and 14 from the circuit of rotor 7 and thereby increases the lowering torque. Simultaneously, the contacts 19-3 close to energize relay 37 and open the contacts 37-1 in the eddy current brake circuit. At this time, the motor 1 drives down with a low circuit motor resistance provided by sections 11 and 12 and the eddy current brake 5 is de-energized.

This condition exists during a second timing period created by the timing relay 58 which is connected in parallel with the relay 37. After the second timing period, the contacts 58-1 close to energize relay 20 in line L-5 and reduce the rotor resistance to the permanent rotor section 11. At this stage, the motor 1 drives down with only the minimum rotor circuit resistance and with the eddy current brake de-energized to provide a rapid lowering speed.

Thus, the present invention provides a plurality of hoisting and lowering speeds with the eddy current brake 5 selectively connected into the circuit to provide a more accurate control of the hoisting operation. However, whenever the motor 1 is energized with minimum rotor excitation as a result of the energizing of the relay 20, the circuit to the eddy current brake 5 is opened. Consequently, the danger of high current surges, in both the hoisting and lowering directions, which would tend to overheat and damage the motor are essentially eliminated. A particularly important feature provided with the invention is the positive holding of the service friction brake 4 until and unless the eddy current brake 5 is first receiving at least the excitation employed in the hoisting direction. This is of very substantial and practical importance in that it eliminates the dangers attendant sudden, uncontrolled downward movement of the load in the event the motor 1 is open circuited and the master switch is set to a hoist position.

The present invention thus provides maximum safety in operation of the hoist motor and the total system by providing a positive friction brake hold of the hoist system if the circuit for the eddy current brake is not first established.

Various modes of carrying out the invention are contemplated as being within the scope of the following claims particularly pointing out and distinctly claiming the subject matter which is regarded as the invention.

I claim:

1. In an electric hoist costrol system employing a hoist drive motor in combination with an electrically controlled on-off set brake and a proportional brake having a winding, the braking force of the proportional brake being proportional to the degree of energization of the winding, a control means to control the direction and speed of the drive motor, the improvement in the circuit connection of the set brake and the proportional brake comprising, a power circuit for said winding including electro-responsive means connected in the power circuit through said winding and controlling a switch means, and a power circuit for said set brake including said switch means and an operating means connected in circuit by said control means for all speed and direction settings such that the proportional brake is energized before said set brake is released for all directions and speeds.

2. In an electric hoist control system employing a hoist drive motor in combination with an electrically controlled on-off set brake and a proportional brake having a winding, the braking force of the proportional brake being proportional to the degree of energization of the winding, control means having a motor stop position and a motor operate position, the improvement in the circuit connection of the set brake and the proportional brake comprising, a power circuit for said winding including electro-responsive means controlling a switch means, said electro-responsive means having a selected operating level, means in said circuit supplying power to the winding and the electro-responsive means below said selected level with the control means in a motor stop position and above said level in all motor operate positions, and a power circuit for said set brake including said switch means whereby the proportional brake must be energized at least to said selected operating level before said set brake is released.

3. In an electric hoist control system employing a hoist motor having a rotor circuit with a plurality of rotor resistor sections and providing a speed commensurate with the rotor resistance in combination with an electrically controlled set brake and an eddy current brake having a winding, braking force of the eddy current brake being proportional to the energizing level of the winding, the improvement in the circuit connection of the set brake and the eddy current brake comprising, a power circuit for said eddy current brake winding including electroresponsive means controlling a switch means, a power circuit for said set brake including said switch means whereby the eddy current brake must be energized before said set brake is released, means to vary the energization of the eddy current brake winding between full excitation and a minimum excitation, means to selectively disconnect selected ones of said resistor sections, and a control circuit for said last two named means including a plurality of operating conditions arranged whereby at least one of said selected ones of said resistor sections is in circuit whenever the winding of the eddy current brake is fully excited.

4. The hoist system of claim 3 having
a control means including means for selectively connecting said rotor sections in circuit and means for opening the power circuit to said winding.

5. In a hoist system employing a hoist motor in combination with an electrically controlled set brake and an eddy current brake, the improvement in the circuit connection comprising,
a power circuit for said eddy current brake and an electrically actuated switching means controlling a switch means including adjusting means to vary the current supplied to the eddy current brake and to the switching means,
a power circuit for said set brake including said switch means whereby the eddy current brake must be energized before said set brake is released, and
control means forming a part of the power circuit and controlling said adjusting means and having an off-point position energizing the eddy current brake at a level below the operating level of the switching means and lowering positions establishing maximum energizing of the eddy current brake at a level above the operating level of the switching means and hoisting positions establishing an intermediate energizing of the eddy current brake at a level above the operating level of the switching means.

6. In a hoist system employing a hoist motor in combination with an electrically controlled set brake and an eddy current brake having a winding with the degree of braking proportional to the energization of the winding, the improvement in the circuit connection comprising,
a power circuit for said winding including electrically actuated interlock means controlling a switch means and a means including a plurality of paralleled impedances for adjusting the energizing of said winding and interlock means, said interlock means being inoperable below a selected level of energization,
a control circuit having means to control the operative connection of said paralleled impedances to selectively energize the interlock means and winding below and above said selected operating level and having an electrically actuated release means controlled by said switch means and controlling a release switch means, and
a power circuit for said set brake including said release switch means.

7. The hoist system of claim 6 wherein said hoist motor includes a wound rotor connected in a rotor circuit with a plurality of rotor resistor sections, and said control circuit includes means relating the energizing of the brake winding and the amount of resistance in the rotor circuit by selective disconnection of the resistor sections.

8. In a hoist system employing a hoist motor having a wound rotor circuit with a plurality of rotor resistor sections including a permanent section, low resistance section, an intermediate resistance section and a high resistance section and in combination with an electrically controlled set brake and an eddy current brake, the improvement in the circuit conection comprising,
a first power circuit including the set brake and having a set of normally open release contacts,
a second power circuit including the eddy current brake winding connected in a series circuit with an interlock relay and a set of normally closed disconnect contacts and a set of normally open hoist contacts and a first variable resistor, a branch circuit connected across the hoist contacts and the first variable resistor and including a set of normally open lower contacts connected in series with a second variable resistor,
a release relay controlling said release contacts and controlled by said interlock relay, and
a control circuit including said release relay and a disconnect relay for said disconnect contacts and having a plurality of hoisting and lowering positions including an off-point wherein the control circuit relays are de-energized, a first hoist position energizing the motor with maximum rotor circuit resistance and closing the hoist contacts, a second hoist position with a portion of the rotor resistor sections connected and with the hoist contacts closed and a third hoist position established in steps, a first of which includes with lesser rotor resistor sections connected than in the second hoist speed and with the disconnect relay energized and the second step of which includes a minimum number of rotor resistor sections and with the disconnect relay energized.

9. In a hoist system employing a hoist motor having a rotor circuit with a plurality of rotor resistor sections selctively connected in circuit and providing a torque commensurate with the rotor resistance in combination with an electrically controlled set brake and an eddy current brake having a winding with the braking force proportional to the degree of energization of the winding, the improvement in the circuit connection of the set brake and the eddy current brake winding comprising,
a source of direct current,
a first power circuit including the set brake and having a set of normally open safety contacts,
a second power circuit including the eddy current brake winding connected in a series circuit with an interlock relay and a set of normally closed release contacts and a set of normally open hoist contacts and a first resistor, a branch circuit connected across the hoist contacts and the first variable resistor and including a set of normally open lower contacts connected in series with a second resistor,
a relay controlling said safety contacts and controlled by contacts of said interlock relay,
a relay controlling said release contacts,
a relay controlling the hoist contacts,
a relay controlling the lower contacts, and
a control means for selectively controlling said last three named relays.

10. In a hoist system employing a hoist motor having a rotor circuit with a plurality of rotor resistor sections and providing a torque commensurate with the rotor resistance in combination with an electrically controlled set brake and an eddy current brake having a winding with the degree of energization of the winding, the improvement in the circuit connection comprising,
direct current power circuits for separately energizing the set brake and the eddy current brake winding,
an interlock relay having a set of normally open interlock contacts, a disconnect relay having a set of normally closed disconnect contacts,
a hoist relay having a plurality of contacts,
a lower relay having a plurality of contacts,
a variable off-point resistor connected in a series circuit with the disconnect contacts, the interlock relay and the brake winding in the corresponding power brake circuit and being set to prevent energization of the interlock relay as a result of the current through the resistor,
an adjustable moist resistor connected in series with a set of normally open contacts of the hoist relay across the variable resistor and selected to provide an effective impedance with the off-point resistor to energize said interlock relay,
a lower shunt lead including a set of normally open contacts of the lower relay connected in parallel with the variable off-point resistor,
a set brake relay having a set of normally opening brake contacts connected in series with the set brake in the corresponding power circuit, and
a control circuit including a controller for selectively energizing said hoist relay, lower relay, disconnect relay and said set brake relay, the circuit for said set brake relay including said interlock relay contacts, whereby said eddy current brake must be selectively energized prior to energization of the set brake.

11. In the hoist system of claim 10,
resistor section relays having contacts for selectively connecting all but one section of the resistors in the rotor circuit and connected in said control circuit for selective energization,
timing means connected in said control circuit and providing timed connection of the resistor sections relay and of the disconnect relay to produce selected timed acceleraiton of the hoist motor.

12. In the hoist system of claim 10 wherein said control circuit includes presettable contactor means to provide sequential hoisting speeds including
a first hoist speed established by energizing said hoist relay and said set brake relay,
a second hoist speed established by energizing said hoist relay, said set brake relay and a resistor section relay to eliminate a resistor section and a first of the timing relays having contacts in series with a rotor section relay and contacts in parallel with the interlock relay contacts, and
a third hoist speed established by maintaining the circuit of the second hoist speed and establishing a circuit through the resistor section relay in series with the first timing relay contacts to remove a resistor section and to energize the disconnect relay and a second timing relay, said second timing relay having contacts connected in series with a third rotor resistor section relay in parallel with the second rotor resistor section to remove a third resistor section a selected time after energization thereof.

13. In the hoist system of claim 10 wherein said control circuit includes presettable contactor means to provide sequential lowering speeds, including
a first lowering speed established by energizing the lower relay and said set brake relay,
a second lowering speed established by maintaining the first lowering speed circuit and simultaneously energizing the motor, and
a third lowering speed established in steps by energizing the rotor section relays in timed sequence by energization of the timing means with the second rotor section relay and the disconnect relay being simultaneously energized to produce a second step.

14. In a hoist system employing a hoist motor having a rotor circuit with a plurality of rotor resistor sections and providing a torque commensurate with the rotor resistance in combination with an electrically controlled set brake and an eddy current brake having a brake winding with the degree of braking proportional to the energization of the winding, the improvement in the circuit connections comprising,
incoming power leads for said hoist motor,
a transformer-rectifier combination connected to the power leads to provide a pair of direct current leads, one of which is connected in common to the set brake and to the eddy current brake winding and the second of which is separately connected to the opposite side of both brakes,
an interlock relay having a set of normally open interlock contacts and connected in series with a set of normally closed release contacts and a variable off-point resistor between the second lead and the eddy current brake, said resistor being set to prevent energization of the interlock relay as a result of the current through the resistor,
a hoist resistor connected in series with a set of normally open contacts across the variable resistor, the hoist resistor being variable and paralleled currents through the hoist resistor and the variable off-point resistor being sufficient to energize said relay,
a lower shunt lead including a set of normally open contacts connected in parallel with the variable resistor,
a set brake lead including a set of normally opening brake contacts connected between the second direct current lead and the set brake,
a control circuit including a drum type controller having a plurality of branch circuits including a set of drum contacts and having at least three hoist positions and at least three lower positions,
a first branch circuit including a set of normally open drum contacts closed in all of said three hoist and lower positions and being connected in series with a brake release relay for controlling the brake contacts and a set of normally open interlock contacts of said interlock relay,
a lowering control relay coupled to the contacts in said shunt lead and connected in series with a set of normally closed hoist contacts across said brake relay and said interlock contacts,
a second branch circuit including a set of normally open drum contacts closed in the two last lower positions and a set of normally closed hoist contacts in series with a set of normally open timed contacts and a lowering relay having contacts connecting in the power leads,
jumper lead means connecting said first and second branch circuit to parallel the interlock contacts and the timed contacts,
a third branch circuit including a set of normally open drum contacts closed in all three hoist positions and connected in series with a set of normally closed contacts of said lowering relay and a hoist relay,
a fourth branch circuit including a set of normally open drum contacts closed in the last two of the three hoist positions and the last of the three lower positions and a set of normally open brake contacts of said brake relay and a first rotor section relay,
a fifth branch circuit having a timing relay connected in series with normally open contacts of the first rotor section relay, said timing relay including contacts one of which is the timing contacts in the second branch circuit,
a sixth branch circuit including normally open drum contacts closed in the last of the hoist and lower positions and connected in series with a set of normally open contacts of the timing relay and a second rotor resistance section relay,
a seventh branch circuit including normally open contacts of said second rotor resistance section relay and an eddy current release relay, said release relay controlling the release contacts in the circuit of said interlock relay,
a second timing relay connected in parallel with the release relay and having normally open timing contacts, and
a third rotor resistance section relay in series with the last named timing contacts connected in parallel with the second rotor resistance section relay and the first timing contacts.

References Cited
UNITED STATES PATENTS

| | | | |
|---|---|---|---|
| 2,488,210 | 11/1949 | Leitch | 318—203 X |
| 2,488,238 | 11/1949 | Rathbun | 318—203 |
| 2,581,292 | 1/1952 | Rathbun | 318—203 |
| 2,581,315 | 1/1952 | Widdows et al. | 318—203 |
| 2,687,505 | 8/1954 | Schurr | 318—203 X |
| 2,689,934 | 9/1954 | Wendelburg | 318—203 X |
| 2,739,279 | 3/1956 | Eliot et al. | 318—203 |
| 2,766,416 | 10/1956 | Myles et al. | 318—203 X |
| 2,963,634 | 12/1960 | Cortelli et al. | 318—203 X |
| 3,123,756 | 3/1964 | Horsley | 318—382 X |

ORIS L. RADER, *Primary Examiner.*

G. Z. RUBINSON, *Assistant Examiner.*